United States Patent [19]
Hägele et al.

[11] Patent Number: 4,979,405
[45] Date of Patent: Dec. 25, 1990

[54] RACK-TYPE STEERING GEAR, PARTICULARLY FOR USE IN MOTOR VEHICLES

[75] Inventors: Gerhard Hägele, Hohenstadt; Ansgar Betz; Herbert Winter, both of Schwäbisch Gmünd, all of Fed. Rep. of Germany

[73] Assignee: Zahnradfabrik Friedrichshafen, AG., Friedrichshafen, Fed. Rep. of Germany

[21] Appl. No.: 381,398

[22] PCT Filed: Feb. 2, 1988

[86] PCT No.: PCT/EP88/00072
§ 371 Date: Jun. 27, 1989
§ 102(e) Date: Jun. 27, 1989

[87] PCT Pub. No.: WO88/06113
PCT Pub. Date: Aug. 25, 1988

[30] Foreign Application Priority Data
Feb. 14, 1987 [DE] Fed. Rep. of Germany ....... 3704703

[51] Int. Cl.$^5$ .................. F16H 19/04; B62D 1/20
[52] U.S. Cl. .......................... 74/422; 74/498
[58] Field of Search ............ 74/89.17, 422, 498; 180/147, 148

[56] References Cited

U.S. PATENT DOCUMENTS 3,630,099 12/1971 Miyoshi ............................... 74/498
4,669,328 6/1987 Kishi et al. ........................... 74/422

FOREIGN PATENT DOCUMENTS 2017603 10/1970 Fed. Rep. of Germany .
1384997 11/1964 France .
2264700 10/1975 France .
2037931 7/1980 United Kingdom .

*Primary Examiner*—Allan D. Herrmann
*Attorney, Agent, or Firm*—Albert M. Zalkind

[57] ABSTRACT

A rack and pinion gear system in a gear casing for vehicle steering has a spring biased rack against the pinion at one side of the pinion to maintain pinion engagement with the rack. On the other side of the pinion is a generally semicircular bracing bushing encompasssing the pinion and slightly spaced therefrom to brace the pinion in event of bending due to operational stresses. The bracing bushing is carried for support against the gear casing and secured in any suitable manner or may be cast as part of it.

7 Claims, 2 Drawing Sheets

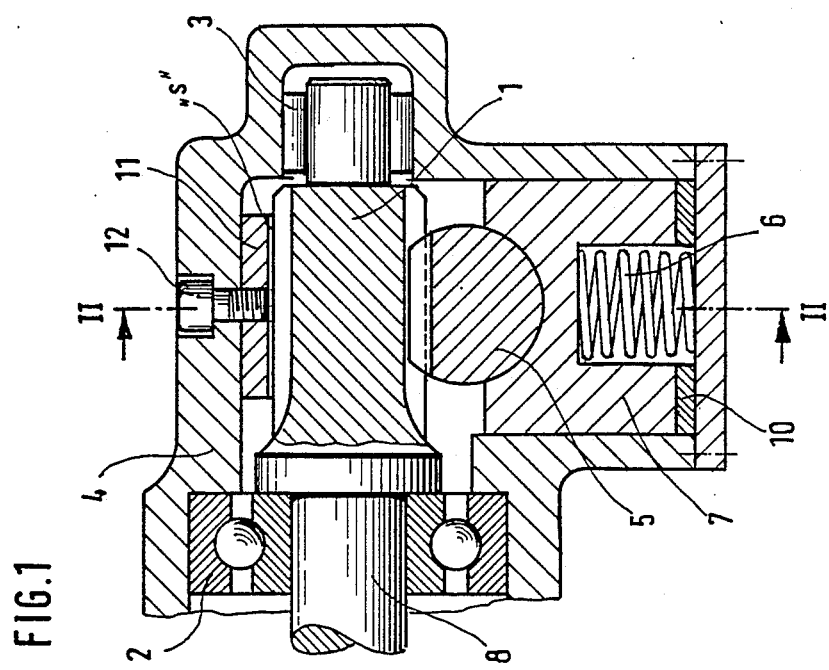
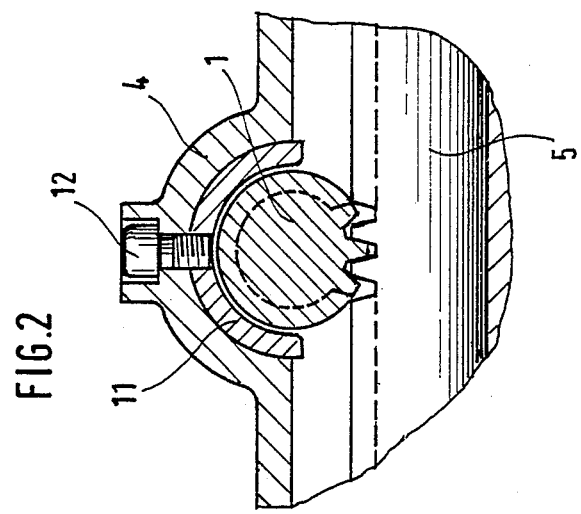

RACK-TYPE STEERING GEAR, PARTICULARLY FOR USE IN MOTOR VEHICLES

The invention is concerned with a steering rack steering gear, especially for motor vehicles.

BACKGROUND OF THE INVENTION

Steering rack steering gears are especially suitable for installation in passenger cars and minibuses. Such steering gears as are known from GB No. 20 37 931, for example, have a steering rack that engages with a driving pinion by spring bias on a pressure block. As a result, the steering rack stays meshed with the driving pinion even with imperfections, and no rattling noises occur. The pressure block has the additional function of increasing the steering mechanism's intrinsic friction, as a result of which the axial oscillations of the steering rack and torsional oscillations at the steering wheel can be suppressed. The driving pinion located at the lower end of the steering shaft is supported on both sides by suitable bearings.

In a steering rack steering mechanism with extremely indirect gear ratio, the driving pinion has a relatively small cross section. Therefore, the steering gear does not withstand the torsion and bending forces appearing simultaneously at high steering strains. In the case of strains similar to those in an accident, for example, when bumping over a curbstone at high speed, it is possible that the driving pinion will be broken.

Also, in event of use in a booster power steering system, should the booster power, which normally provides the main force to the rack, fail, then manual force at the steering wheel is used for steering. Such force is through the pinion and causes considerable abnormal stress which can cause bending and breaking.

Therefore, it is the object of the invention to improve the stability under load of a steering rack steering gear by keeping the harmful bending forces acting on the driving pinion as low as possible.

BRIEF DESCRIPTION OF THE PRESENT INVENTION

In the present invention, the steering gear case surrounding the driving pinion is constructed so that the driving pinion is disposed with a peripheral area on the opposite side of the steering rack and facing the steering gear case. As a result, even though rather powerful bending forces in the steering gear case occur, the driving pinion can be braced. The driving pinion's breaking strength is increased by this means when the dimensions are the same. It is advantageous to install a bracing bushing in the steering gear case that encompasses the driving pinion at an angle of approximately 180°. Under normal driving strain, the pinion can move freely in this supporting bushing. The steering operation is undisturbed. However, the bracing bushing permits only a limited bending of the driving pinion under heavy steering strain. Therefore, breaking of the pinion is avoided.

The bracing bushing or bracing member can be secured in the case by any suitable means. For example, bolted, riveted, cemented, etc., into the steering gear case. It is also possible to cast the bushing directly into the case as a radially internal projecting part.

A detailed description of the invention now follows, in conjunction with the appended drawing.

FIG. 1 shows a partial longitudinal section through the steering gear.

FIG. 2 shows a cross section along the line II—II in FIG. 1.

Figure 4:
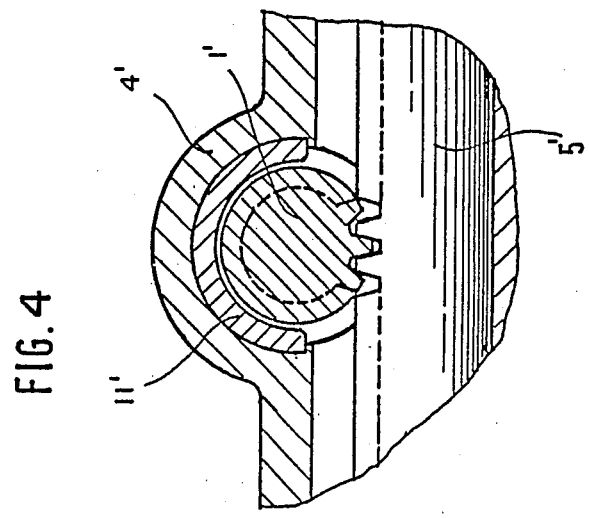
FIG. 4 shows a radial cross section along the line IV—IV of FIG. 3.

In FIG. 1, a driving pinion is supported on ball and roller bearings 2 and 3, respectively, in a steering gear casing 4. A steering rack 5 engages the driving pinion 1. A pressure block 7 biased by a spring 6 forces the steering rack 5 into the gear tooth system of the driving pinion 1. A steering shaft 8 connects a steering wheel (not shown) with the driving pinion 1. The distance between the pressure block 7 and the steering rack 5 is adjustable by a compensating disk 10. It is also possible to adjust that distance by means of a threaded pin.

In the invention, a bracing bushing or member 11 is installed in the steering gear casing 4 above the driving pinion 1. In this instance, the bracing bushing 11 is secured to the steering gear casing 4 by one or more bolts, such as bolt 12.

As can be seen in FIG. 2, the bushing 11 closely encompasses the driving pinion 1 at an angle of 180°.

If the steering rack 5 transmits a sharp shock to the driving pinion 1, coming from one of the steered wheels, the bracing bushing or member 11 is close enough after crossing a gap "S" to engage the pinion to prevent breakage. Under a normal load, the driving pinion 1 rotates completely freely, so that no friction losses develop.

Figure 3:
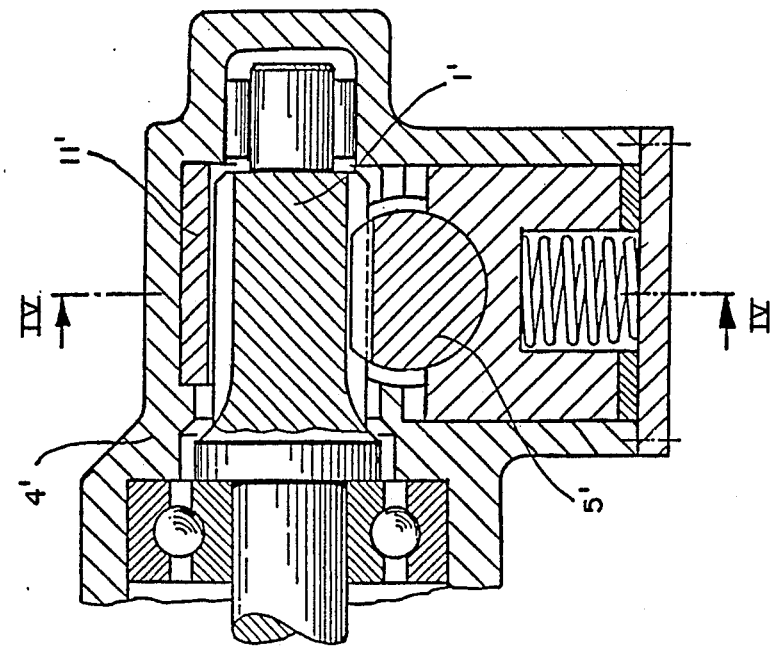
FIG. 3 is a longitudinal section to illustrate the combination of bracing member cast into the gear casing.

FIG. 3 shows a longitudinal view wherein a pinion $1^1$ engages a rack $5^1$. Cast into the gear casing $4^1$ is bracing member $11^1$.

FIG. 4 shows a radial section of FIG. 3.

We claim:

1. In a steering gear of the type having a gear casing (4) carrying a rack (5) and pinion (1) in engagement and having a steering shaft (8) connection and including a spring biased bearing block (7) acting against said rack on one side of said pinion to maintain tooth engagement between said pinion and rack;

the improvement including a bracing member (11) secured against said casing on the opposite side of said pinion and engageable therewith to brace said pinion against bending to a breaking stress effected by excessive forces thereon.

2. In a steering gear as set forth in claim 1, wherein said bracing member encompasses said pinion for approximately 180°.

3. In a steering gear as set forth in claim 1, wherein said bracing member is spaced at a predetermined distance "S" around said pinion.

4. In a steering gear as set forth in claim 1, wherein said bracing member is carried against the interior wall of said casing.

5. In a steering gear as set forth in claim 1, wherein said bracing member is cast as an integral part of the inner wall of said casing.

6. In a steering gear as set forth in claim 2, wherein said bracing member is spaced at a predetermined distance "S" around said pinion.

7. In a steering gear as set forth in claim 6, wherein said bracing member is carried against the interior wall of said casing.

* * * * *